Feb. 9, 1971  A. SOODALTER  3,561,192

SLEEVING DEVICE

Filed Jan. 16, 1969

INVENTOR.
ARNOLD SOODALTER
BY Kenwood Ross and
Chester E. Flavin
ATTORNEYS.

United States Patent Office 3,561,192
Patented Feb. 9, 1971

3,561,192
SLEEVING DEVICE
Arnold Soodalter, 134 Tanglewood Drive,
Longmeadow, Mass. 01106
Filed Jan. 16, 1969, Ser. No. 791,596
Int. Cl. A22c 11/02, 13/00
U.S. Cl. 53—197                    1 Claim

ABSTRACT OF THE DISCLOSURE

Apparatus for sleeving butcher's netting onto a cylindrical magazine comprising, a sleeving device having an opening therein, gripper wheels surrounding the opening and extending thereinto and adapted for functional engagement with the netting on the magazine, and unidirectional clutch means for permitting rotation of the wheels in one direction only.

BACKGROUND OF THE INVENTION (1) Field of the invention

Apparatus for sleeving netting onto tubes or containers.

(2) Description of the prior art

To my knowledge butcher's netting has always been so sleeved completely by hand without the use of any tools.

SUMMARY OF THE INVENTION

A device for quickly and easily sleeving butcher's netting onto a cylindrical supply roll or tube.

A sleeving device which is extremely simple in its construction so as to be inexpensive in its manufacture and uncomplicated in its manner of use.

DESCRIPTION OF THE PREFERRED EMBODIMENT

Figure 1:
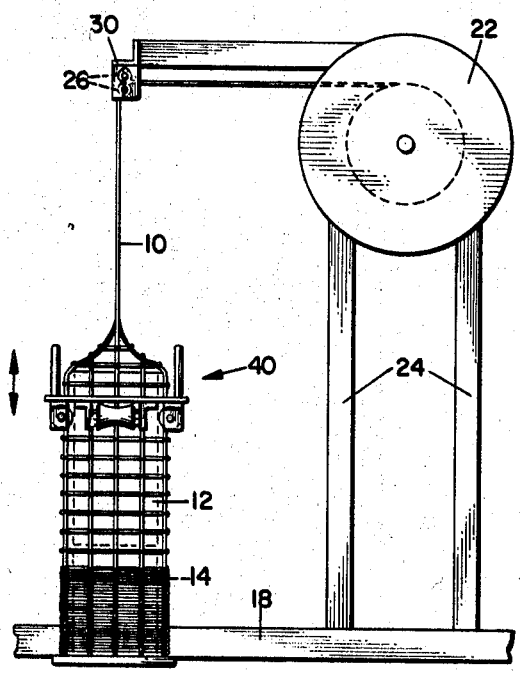
FIG. 1 is a side elevational view of sleeving apparatus incorporating the sleeving device of the invention.
Figure 2:
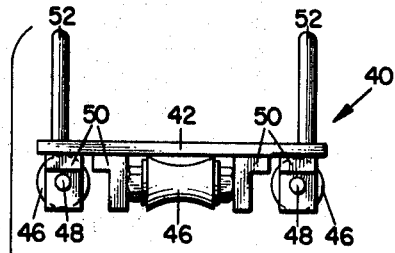
FIG. 2 is an exploded elevational view of certain components of the sleeving apparatus of FIG. 1.
Figure 2:
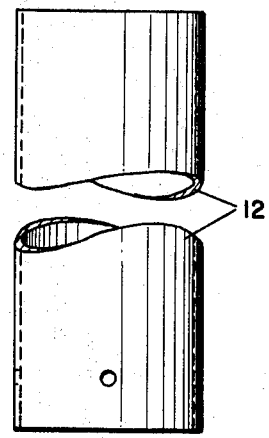
Figure 3:
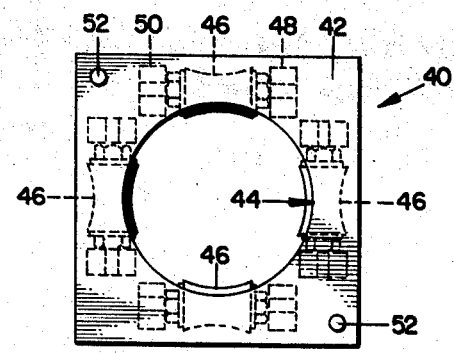
FIG. 3 is a top plan view of the sleeving device of the invention.
Figure 5:
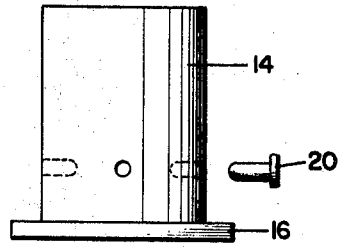
FIG. 5 is an end elevational view of said roller guide means.
Figure 4:
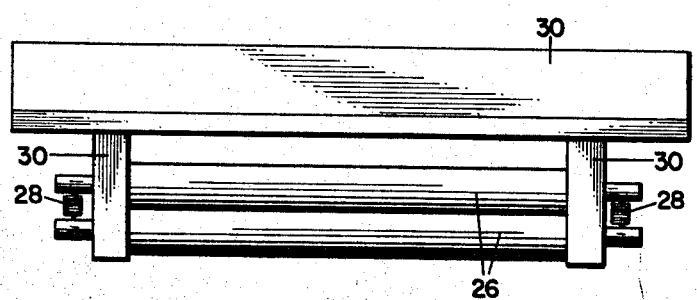
FIG. 4 is a front elevational view of the roller guide means of the sleeving apparatus of FIG. 1.

Many large cuts of meat are encased in a sock-like sleeve of an elastic netting, the netting being applied thereto at a stuffing horn or like machine.

The netting is contained on hollow cylindrical magazines of various sizes to accommodate different cuts of meat.

Heretofore, the sleeving of the netting on the magazines has been done by hand, the operator grasping the netting between his hands and pushing it down over the magazine. Of course, this procedure has been time-consuming and expensive.

By use of the invention hereof, a plurality of magazines may be quickly and easily "loaded" or sleeved with netting.

In the drawing, the netting is indicated at 10 and comprises stretchable longitudinally and laterally-extending strands interconnected to form an open-ended sock-like structure.

The netting is sleeved upon a hollow cylindrical magazine 12, preferably, but not necessarily formed from a transparent, easy to clean plastic, the magazine being releasably supported or sleeved upon a cylindrical stand 14 extending upwardly from a bracket 16 fixed to a frame 18.

A pin 20 may be inserted into aligned openings in the magazine and stand to preclude magazine rotation during loading.

The netting is contained on a reel or spool 22 rotatably supported relative to a pair of upright supports 24 on frame 18, the free end of the netting passing between a pair of guide rollers 26, loaded as by springs 28 and rotatably mounted in brackets 30 fixed to supports 24, the rollers being disposed above stand 14 and the magazine sleeved thereon.

The upper roller of the pair is free to move vertically, it being mounted at its ends in elongated slots 32 in the brackets 30.

The lower end of the netting is sleeved upon the magazine by the sleeving device of the invention, generally indicated by 40.

Sleeving device 40 comprises a plate-like body 42 having a central annular opening 44 therein of slightly larger diameter than that of magazine 12, and a plurality of concave rubber gripper wheels 46 surrounding opening 44 and having a portion of their peripheries extending into the opening so as to define an opening concentric with opening 44 and approximately the same diameter as that of magazine 12.

Gripper wheels 46 are identical to each other and are each mounted on a shaft 48 journalled at its ends relative to brackets 50 depending from the lower surface of body 42.

A uni-directional clutch, not shown, is associated with each shaft so that the gripper wheels may be rotated in one direction but not in the other. Clutches of the types shown in U.S. Pats. No. 3,184,020 and No. 3,260,333 to the Torrington Company may be employed.

A pair of handles 52 is provided on the upper surface of body 42 so that the sleeving device may be easily moved.

In use, the netting is slipped through opening 44 of the sleeving device and onto the upper end of the magazine. The sleeving device is then moved downwardly onto the magazine so that the gripper wheels embrace the netting. It is then pushed downwardly along and relative to the magazine carrying the netting therewith to the lower end of the magazine.

On such downward stroke of the sleeving device, the gripper wheels are locked against rotation by the clutch means and frictionally engage the netting pushing it to the lower end of the magazine.

On the upward stroke of the sleeving device, however, the rollers are free to rotate. Thus, when the device is raised from the bottom of the magazine to the top the rollers do not grip the netting, but pass freely thereover.

When the device reaches the top of the magazine, it is moved rapidly downwardly to push more netting onto the magazine. This procedure is repeated until the magazine is completely filled with netting, at which time the netting is cut, the pin 20 removed, and the loaded magazine raised from stand 14 and replaced with an empty magazine whereupon the loading procedure is repeated.

While the sleeving device has been shown as of the hand-operated type, it could be automatically operated with equal facility.

The spring loaded rollers 26 keep sufficient tension on the netting so that it does not roll off the reel 22 too freely on the downward stroke of the sleeving device.

No specific clutch device has been shown since any commercially available type, such as the types shown in the aforementioned U.S. Patents No. 3,184,020 and No. 3,260,333, may be utilized. In fact, even a ratchet and pawl type arrangement could be used.

I claim:
1. In combination with a magazine for netting, a sleeving device having an opening therein, the size of the opening being substantially complemental to that of the magazine, netting extending through the opening in the sleeving device and sleeved on the magazine, grippers in the form of concave wheels extending into said opening and rotatably mounted on the sleeving device, and uni-directional clutch means on the sleeving device for permitting rotation of the wheels in only one direction, the grippers being adapted to engage the netting as the sleeving device is reciprocated relative to the magazine for loading the netting onto the magazine.

References Cited

UNITED STATES PATENTS

| | | | |
|---|---|---|---|
| 1,256,570 | 2/1918 | Johnston | 26—56 |
| 1,334,164 | 3/1920 | Palmer | 26—56 |
| 1,761,189 | 6/1930 | Brennan et al. | 17—42 |
| 3,397,069 | 8/1968 | Urbutis et al. | 17—42X |
| 3,412,523 | 11/1968 | Raymond et al. | 53—197 |

THERON E. CONDON, Primary Examiner

N. ABRAMS, Assistant Examiner

U.S. Cl. X.R.

17—42; 53—390